US012602535B2

(12) United States Patent
Ni et al.

(10) Patent No.: US 12,602,535 B2
(45) Date of Patent: Apr. 14, 2026

(54) COMMENT DISPLAY METHOD AND APPARATUS OF A DOCUMENT, AND DEVICE AND MEDIUM

(71) Applicant: Beijing Zitiao Network Technology Co., Ltd., Beijing (CN)

(72) Inventors: Jianfeng Ni, Beijing (CN); Xuxin Zheng, Beijing (CN); Jingyi Wei, Beijing (CN); Zijie Hu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/763,951

(22) Filed: Jul. 3, 2024

(65) Prior Publication Data

US 2024/0362399 A1 Oct. 31, 2024

Related U.S. Application Data

(63) Continuation of application No. PCT/CN2023/071893, filed on Jan. 12, 2023.

(30) Foreign Application Priority Data

Jan. 20, 2022 (CN) .......................... 202210068550.1

(51) Int. Cl.
*G06F 40/106* (2020.01)
*G06F 40/169* (2020.01)
*G06F 40/58* (2020.01)
(52) U.S. Cl.
CPC .......... *G06F 40/106* (2020.01); *G06F 40/169* (2020.01); *G06F 40/58* (2020.01)

(58) Field of Classification Search
CPC .... G06F 40/106; G06F 40/169; G06F 3/0482; G06F 3/04842; G06F 16/93; G06F 40/58;
(Continued)

(56) References Cited

U.S. PATENT DOCUMENTS 8,468,149 B1 * 6/2013 Lung ..................... G06F 16/951
707/769
8,996,985 B1 3/2015 Johnston et al.
(Continued)

FOREIGN PATENT DOCUMENTS

CN 110264163 A 9/2019
CN 111597467 A 8/2020
(Continued)

OTHER PUBLICATIONS

International Search Report received for PCT Patent Application No. PCT/CN2023/071893, mailed on Mar. 21, 2023, 5 pages (2 pages of English Translation and 3 pages of Original Document).
(Continued)

*Primary Examiner* — Wilson W Tsui
(74) *Attorney, Agent, or Firm* — Astute IP Law Group

(57) ABSTRACT

The embodiments of the disclosure relates to a comment display method, apparatus, equipment and medium of a document, wherein the method comprises: in response to a comment operation of a first user on an online document, displaying a first comment(s) in a first area of the online document; in response to a trigger operation of a second user on a comment mode control in the online document, determining at least one second comment to be displayed from the first comment(s); and displaying the at least one second comment in the first area of the online document.

17 Claims, 4 Drawing Sheets

(58) Field of Classification Search
CPC .... G06Q 10/10; G06Q 10/101; H04L 51/216;
H04L 65/403
See application file for complete search history.

(56) References Cited

U.S. PATENT DOCUMENTS

| | | | | |
|---|---|---|---|---|
| 9,383,888 | B2 * | 7/2016 | Fish | G06F 3/04842 |
| 10,341,275 | B2 * | 7/2019 | Carriero | H04L 51/08 |
| 10,798,341 | B1 * | 10/2020 | Hegde | H04N 21/8549 |
| 2006/0282762 | A1 * | 12/2006 | Diamond | G06F 40/169 |
| | | | | 715/235 |
| 2010/0306796 | A1 | 12/2010 | Mcdonald et al. | |
| 2011/0154192 | A1 * | 6/2011 | Yang | G06F 40/171 |
| | | | | 715/256 |
| 2013/0124978 | A1 * | 5/2013 | Horns | G06F 40/169 |
| | | | | 715/780 |
| 2013/0191720 | A1 * | 7/2013 | Simons | G06F 3/0481 |
| | | | | 715/234 |
| 2014/0053071 | A1 * | 2/2014 | Penner | G06Q 10/10 |
| | | | | 715/732 |
| 2016/0028660 | A1 * | 1/2016 | Weishaupl | H04L 63/10 |
| | | | | 709/206 |
| 2017/0185575 | A1 * | 6/2017 | Sood | G06F 3/0482 |
| 2018/0253412 | A1 * | 9/2018 | Biswas | H04L 65/4015 |
| 2018/0351903 | A1 * | 12/2018 | Allen | H04L 51/04 |
| 2022/0366124 | A1 | 11/2022 | Jiang et al. | |

FOREIGN PATENT DOCUMENTS

| | | |
|---|---|---|
| CN | 112114734 A | 12/2020 |
| CN | 112835860 A | 5/2021 |
| CN | 112286422 A | 1/2022 |
| CN | 114417784 A | 4/2022 |

OTHER PUBLICATIONS

Office Action received for Chinese Patent Application No. 202210068550.1, mailed on Apr. 7, 2023, 20 pages (8 pages of English Translation and 12 pages of Original Document).

* cited by examiner conference interface                    first area comment mode
control All comments have
been displayed View all comments Return to previous one

COMMENT DISPLAY METHOD AND APPARATUS OF A DOCUMENT, AND DEVICE AND MEDIUM

CROSS-REFERENCE TO RELATED APPLICATIONS

This application is a continuation application of PCT/CN2023/071893 filed Jan. 12, 2023, which claims priority to and is based on a Chinese patent application No. 202210068550.1 filed on Jan. 20, 2022, which are hereby incorporated by reference in their entireties into the present application.

TECHNICAL FIELD

The present disclosure relates to the field of computer technology, in particular to a comment display method and an apparatus of a document, a device and a medium.

BACKGROUND

Online document is a common way of multi-user cooperation in modern conference scenarios. In a conference, multiple users browse and comment an online document together. During an explanation of comments by a presenter, when there are a large number of comments, multiple comments will all be displayed in a current interface.

SUMMARY

According to some embodiments of the present disclosure, a comment display method of a document is provided, comprising:

in response to a comment operation of a first user on an online document, displaying a first comment(s) in a first area of the online document;

in response to a trigger operation of a second user on a comment mode control in the online document, determining at least one second comment to be displayed from the first comment(s); and displaying the at least one second comment in the first area of the online document.

Some embodiments of the disclosure also provide a comment display apparatus of a document, comprising:

a first response module configured to, in response to a comment operation of a first user on an online document, display a first comment(s) in a first area of the online document;

a second response module configured to, in response to a trigger operation of a second user on a comment mode control in the online document, determine at least one second comment to be displayed from the first comment(s), wherein the at least one second comment is at least one of the first comment(s);

a comment display module configured to display the at least one second comment in the first area of the online document.

Some embodiments of the present disclosure also provide an electronic equipment, comprising: a processor; a memory for storing executable instructions that can be executed by the processor; the processor is used to read the executable instructions from the memory and execute the instructions to implement the comment display method of a document provided in any of the aforementioned embodiments of this disclosure.

Some embodiments of the present disclosure also provide a non-transitory computer-readable storage medium, which stores a computer program for executing the comment display method of a document provided in any of the aforementioned embodiments of the present disclosure.

BRIEF DESCRIPTION OF THE DRAWINGS

The accompanying drawings herein are incorporated into the specification and form a part of this specification, illustrating embodiments in accordance with the present disclosure and explaining the principles of the present disclosure together with the description.

In order to provide a clearer explanation of the technical solutions in the embodiments of the present disclosure or the prior art, a brief introduction will be given below to the accompanying drawings required by the embodiments or the prior art for descriptions. It is obvious to those skilled in the art that other drawings can be obtained based on these accompanying drawings without creative labor.

DETAILED DESCRIPTION

In order to better understand the above objectives, features, and advantages of the present disclosure, the solution of the present disclosure will be further described below. It should be noted that, if without conflict, the embodiments of the present disclosure and the features in the embodiments can be combined with each other.

Many specific details are elaborated in the following descriptions to facilitate a full understanding of the present disclosure, but the present disclosure may be implemented in other ways different from those described herein; obviously, the embodiments in this description are only a part of the embodiments of the present disclosure, rather than the entire embodiments.

At present, in a process of browsing an online document by multiple users, comments of the online document are generally displayed in full, and the comment being explained cannot be highlighted. As a result, as the comment being explained switches, it is difficult for users to quickly and accurately identify the comment being explained from the comments displayed in full. Based on this, the embodiments of the present disclosure provide a comment display method and apparatus of a document, an equipment, and a medium.

Figure 1:
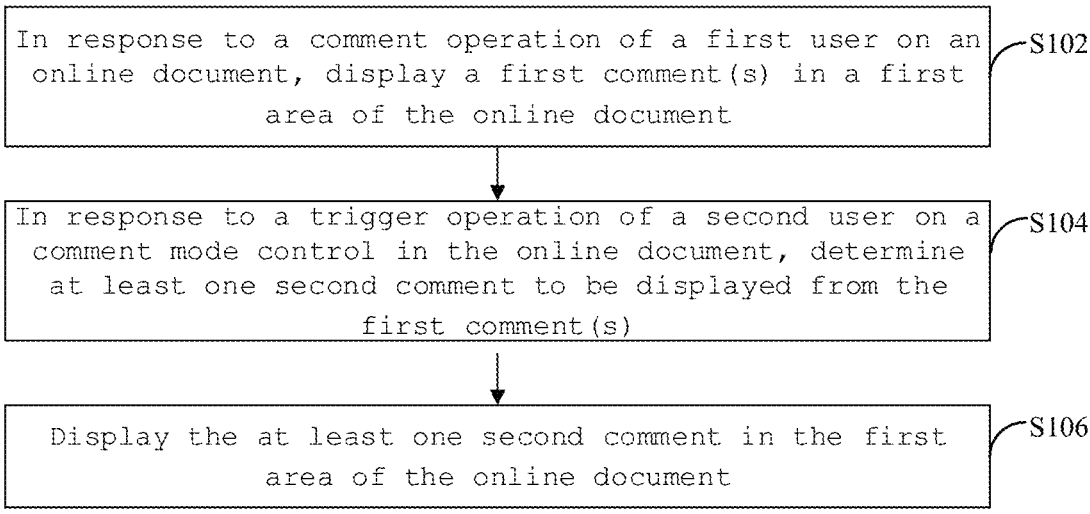
FIG. 1 is a flow schematic diagram of a comment display method of a document provided in the embodiments of the present disclosure.

FIG. 1 is a flow schematic diagram of a comment display method of a document provided in some embodiments of the present disclosure. This method can be executed by a comment display apparatus of a document, wherein the comment display apparatus can be realized by using software and/or hardware and generally can be integrated into an electronic equipment, which can be a server, a mobile terminal, or a server cluster, etc. As shown in FIG. 1, the comment display method specifically comprises the following steps: steps S102-S106.

In step S102, in response to a comment operation of a first user on an online document, a first comment(s) is displayed in a first area of the online document.

The online document is a shared document that multiple users participating in a conference can browse and cooperatively edit in real-time and synchronously in a conference scenario. The first user is any one of the multiple users participating in the conference who can comment on the online document.

In some embodiments, the online document is displayed in a conference interface of the first user, the first comment(s) is obtained in response to the comment operation of the first user on the online document. The comment operation comprises an operation of highlighting words in the online document and annotating a highlighting area with comment content. Based on this, all the first comments of the online document made by at least one first user are obtained and displayed in full in the first area of the online document.

In some embodiments, the first area of the online document is a comment area, which can be present on a left or right side of a document page. The comment content is carried by a first display control in the first area which can accommodate multiple first display controls at the same time, that is, content of multiple comments can be displayed simultaneously in the first area.

In step S104, in response to a trigger operation of a second user on a comment mode control in the online document, at least one second comment to be displayed is determined from the first comment(s), wherein the at least one second comment is at least one of the first comment(s). The second user is a user who participates in the conference and follows a view of a presenter. It can be understood that the second user can be a presenter and/or any user who follows the view of the presenter.

In some embodiments, the online document is displayed in a conference interface of the second user, and a preconfigured comment mode control is displayed in an associated area of the first comment(s); the comment mode control is an entry control used to enter a target browsing mode of a comment(s). In the target browsing mode, multiple users corresponding to the online document only synchronously display at least one comment, namely the second comment, among all the first comment(s). For example, only one second comment is determined to be displayed from all the first comment(s).

In some embodiments, the second user performs a trigger operation on the comment mode control. Firstly, all the first comment(s) of the online document are obtained in response to the trigger operation, wherein the first comment(s) can carry identification information, which may comprise: a sequence identifier representing an arrangement order of each of the first comment(s), a time identifier representing comment time of each of the first comment(s), or an encoding identifier generated for each of the first comment(s) according to a preset encoding rule; and then the at least one second comment to be displayed is determined from the first comment(s) based on the identification information, thereby entering the target browsing mode.

The at least one second comment to be displayed that is determined in the present embodiment is at least one of the first comment(s). Generally speaking, the number of the least one second comment is smaller than the number of the first comments. Compared with displaying the first comments in full, the number of the comments to be displayed reduces in the present embodiment. Based on this, users can quickly and accurately locate the comment(s) that need attention from the at least one second comment.

In step S106, the at least one second comment is displayed in the first area of the online document.

In some embodiments, a second display control is established in the first area and replaces the first display control(s), and the at least one second comment is displayed in the second display control. Only one second display control can be displayed in the first area at a time, for example, only one comment can be displayed in the first area at a time.

In some embodiments, only one second display control can be displayed in the first area at a time, and the second display control can accommodate multiple comments, or accommodate one comment and a reply to the comment.

In the comment display method of a document provided in the embodiments of the present disclosure, the first comment(s) is firstly displayed in the first area of the online document in response to the comment operation of the first user on the online document; and then by the trigger operation of the second user on the comment mode control in the online document, the at least one second comment to be displayed is determined from the first comment(s). Only a small number of the at least one second comment can be displayed in the first area of the online document, when there are multiple first comments. This solution does not require the second user to deliberately select a comment from all the first comment(s), but automatically determines and displays a small number of the at least one second comment from the first comment(s), so that multiple users participating in the conference can quickly locate the second comment that needs attention, thereby ensuring that different users focus their attention on the second comment at the same time, reducing the users' difficulty in browsing comments and improving the user experiences.

According to the above embodiments, the comment display method of a document is detailed below.

Figure 2:
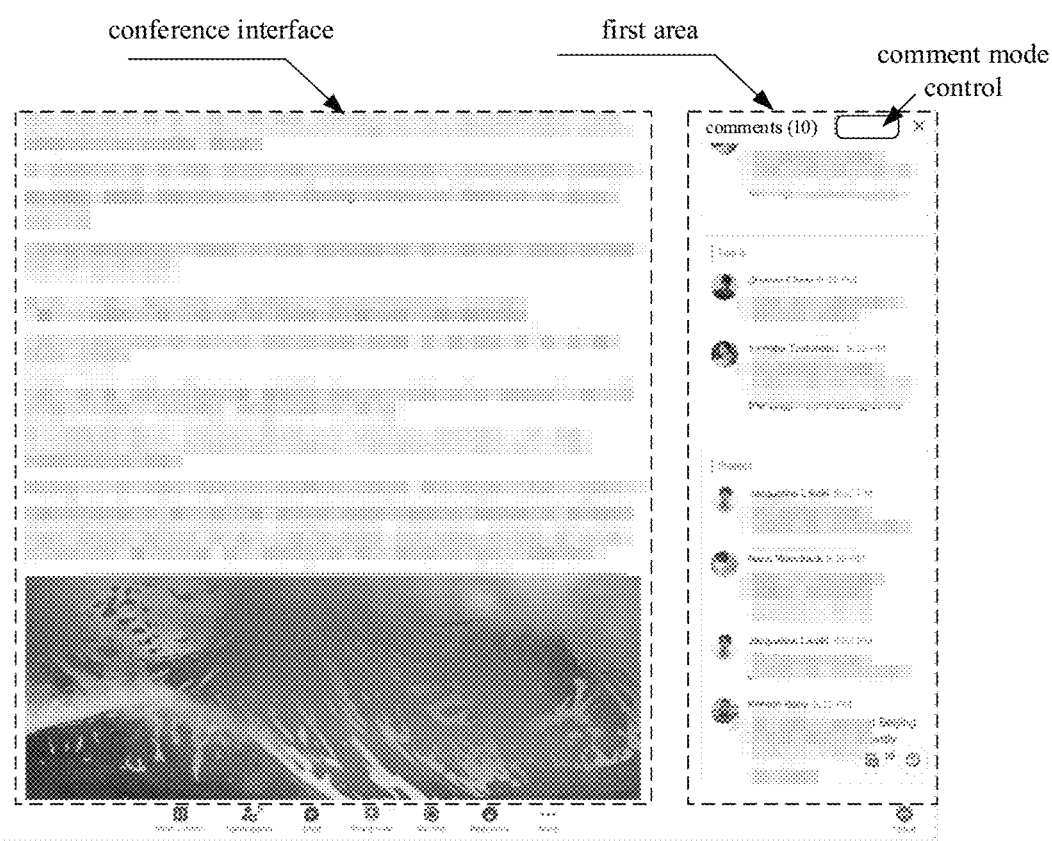
FIG. 2 is a schematic diagram of a conference interface and a first area provided in the embodiments of the present disclosure.

The method provided in the present embodiment further comprises: before responding to the trigger operation of the second user on the comment mode control in the online document, in response to a sharing operation on the online document in the conference interface, the online document is displayed in the conference interface of the second user, and the comment mode control is displayed in an associated area of the first comment(s). The second user is a user following a view of a current presenter. As shown in FIG. 2, the associated area can be set locally in the first area. Of course, FIG. 2 is only an example. In a practical application, the associated area can also be another area that is convenient for displaying the comment mode control, which is not limited herein.

In the present embodiment the comment mode control is displayed in the associated area of the first comment(s) for a presenter and the second user following the presenter. Based on this, the presenter and the second user can perform a trigger operation on the comment mode control and enter a target browsing mode.

In the case of displaying the comment mode control, in response to the trigger operation of the second user on the comment mode control in the online document, the at least one second comment to be displayed is determined from the first comment(s).

In some embodiments, the at least one second comment to be displayed can be determined from the first comment(s) based on a preset display rule or a comment switching operation, and according to identification information carried by the first comment(s). The preset display rule mentioned above may comprise but not limited to: a display rule based on comment arrangement order or a display rule based on comment time. For example, in an implementation of the display rule based on comment arrangement order, the first comment(s) arranged in at least one specified order is determined as the at least one second comment to be displayed based on a sequence identifier of each of the first comment(s); or in an implementation of the display rule based on comment time, at least one first comment with the earliest or the latest annotation time is determined as the at least one second comment to be displayed based on a time identifier of each of the first comment(s). The aforementioned comment switching operation is any operation indicating comment switching, such as an operation of switching to a previous or next comment.

For ease of understanding, the present embodiment provides a method of determining the at least one second comment to be displayed from the first comment(s), comprising: in response to the trigger operation of the second user on the comment mode control in the online document, obtaining the sequence identifier of the each of the first comment(s); determining the at least one second comment to be displayed from the first comment(s) based on the sequence identifier of the each of the first comment(s).

In some embodiments, the first comment(s) can be obtained based on the comment operation of highlighting words in the online document and annotating a highlighting area with comment content. Correspondingly, the sequence identifier representing the arrangement order of the each of the first comment(s) can be obtained based on the highlighting area, and its obtaining manner is shown below.

Firstly, all the highlighting area(s) in the online document is obtained; the first comment(s) annotated in each highlighting area(s) is identified by a sequence number to obtain the sequence identifier of each of first comment(s). The arrangement order of the each of first comment(s) represented by the sequence identifier is consistent with an arrangement order of a position(s) of each of the highlighting area(s) in the online document.

According to the above embodiment, the sequence identifier of the each of the first comment(s) is obtained. Based on this, an embodiment of determining the at least one second comment to be displayed from the first comment(s) according to the sequence identifier of the each of the first comment(s) and the comment switching operations is provided, comprising the following steps.

Step 1, in response to the comment switching operation of the second user, a first sequence identifier of a currently displayed comment and a switching quantity of comments are obtained. The comment switching operation comprises: a trigger operation on a switching control or a comment closing control.

The above comment closing control is a control to control the closing of the currently displayed comment. The above switching control for example comprises: a control to switch to a previous group, a control to switch to a next group, or a control to switch to a n-th group, setting on the first area, or comprises: an external input component of a user terminal such as a joystick button, a keyboard shortcut and so on, that is defined to have a switching function.

Specifically, when the comment switching operation is a trigger operation on the control to switch to the previous group, on the control to switch to the next group, on the external input component, or on the comment closing control, the switching quantity of comments obtained in response to the comment switching operation is one group, which comprises at least one comment; when the comment switching operation is a trigger operation on the control to switch to the n-th group, the switching quantity of comments obtained in response to the comment switching operation is n groups.

Step 2, a second sequence identifier spaced from the first sequence identifier with the switching quantity of comments is determined according to the sequence identifier of the each of the first comment(s).

For ease of description, the present embodiment takes one group including one comment as an example. In response to the comment switching operation on the control to switch to the next group (or the comment closing control), the switching quantity of comments obtained is "1 item", and the first sequence identifier of the currently displayed comment obtained is "2", that is, the currently displayed comment is the second one of all the first comments. In this case, following the sequence identifiers of the first comments from first to last, a sequence identifier that is spaced from the first sequence identifier "2" by "1 item" is found to be "3", and a sequence identifier representing the sequence of "3" is determined as the second sequence identifier.

Step 3, the first comment corresponding to the second sequence identifier is determined as the second comment to be displayed.

In the above embodiment, when the second user performs a clicking operation on the comment closing control, the comment switching operation is triggered, and the currently displayed comment is switched to the next comment as the second comment to be displayed. Alternatively, when the second user performs a clicking operation on the switching control, the comment switching operation is triggered, and the currently displayed comment is switched to the first comments corresponding to the previous group, the next group, or the n-th group of a specified switching as the second comments to be displayed.

In some embodiments, the switching control can be configured with hover information, which is used to prompt a function of the switching control. For example, when the currently displayed comment is the first one of the first comment(s) and a hover event generated by triggering the switching control to switch to the previous group is detected, the following hover message is displayed: the current comment is the first one. In addition, when the currently displayed comment is the first one of the first comment(s), the switching control to switch to the previous group can also be configured to be in an invalid state. The comment switching operation of the second user on the switching control to switch to the previous group is invalid.

In some embodiments, the determining the at least one second comment to be displayed from the first comment(s) comprises: in response to a selecting operation of the second user on a first highlighting area, obtaining a first anchor point pre-marked in the first highlighting area, wherein the first anchor point is configured to direct to the sequence identifier; and determining the first comment corresponding to the sequence identifier to which the first anchor point directs as the at least one second comment to be displayed.

The online document may comprise multiple highlighting areas, each of which can be displayed according to a preset marking style with highlighting, font, and/or color, etc.; the first highlighting area is any one of the highlighting areas in the online document. In response to a selecting operation of the second user on the first highlighting area, the first anchor point of the first highlighting area is obtained, and the at least one second comment to be displayed is determined based on the first anchor point.

At the same time of switching the at least one second comment to be displayed based on the comment switching operation, the highlighting area corresponding to the second comment should also be switched accordingly. Based on this, after the at least one second comment to be displayed is determined from the first comment(s), the method provided in the present embodiment further comprises: obtaining a second highlighting area annotated with the at least one second comment; and displaying document content of the second highlighting area contained in the online document in the conference interface of the second user, wherein the second highlighting area is displayed according to a preset highlighting style.

In the process of switching the at least one second comment to be displayed, in order to facilitate the user to follow the document content corresponding to the at least one second comment in the online document, in the present embodiment, the document content of the second highlighting area contained in the online document can be displayed in the conference interface of the second user. The displayed document content comprises contextual content of the second highlighting area, such as the contextual content starting with a complete sentence containing the second highlighting area, contextual content taking the second highlighting area as a center, and so on. The second highlighting area can be displayed in a highlighted marking style in the displayed document content.

After the at least one second comment to be displayed is determined from the first comment(s) referring to the above embodiments, the at least one second comment is displayed in the first area of the online document in the conference interface of the second user.

In some embodiments, in order to reduce data transmission, a second sequence identifier of the at least one second comment can be sent to terminals used by multiple second users corresponding to the online document. After the second sequence identifier of the at least one second comment is received by the terminals, the received second sequence identifier is compared with the sequence identifiers of multiple local first comments; the at least one first comment with a consistent comparison result is the at least one second comment to be displayed, and the at least one second comment is displayed in the first area of the online document in the conference interface of the second user.

So far, the target browsing mode of comments can be successfully entered, and only a portion of all the first comments as the at least one the second comment can be synchronously displayed to at least one second user corresponding to the online document. In an actual conference scenario, only displaying a small number of the at least one second comment can facilitate multiple users participating in the conference to quickly locate the at least one e second comment that needs to be discussed and communicated, reducing the difficulty of the users in browsing comments and improving the user experiences.

In addition, it should be noted that in the present embodiment, the at least one second comment is displayed in the first area of the online document in the conference interface of the second user, that is, comments are displayed in the conference interface in the target browsing mode which can avoid affecting users who do not participate in the conference to browse the comments, ensuring that users who do not participate in the conference can only access the online document and freely browse the multiple first comments displayed in the first area, etc. The present embodiment can balance browsing demands of both users participating and not participating in the conference for the online document and comments thereof by displaying the at least one second comment in the first area of the online document in the conference interface.

According to the comment switching operation, the at least one second comment displayed in the first area is continuously switched. In the process of switching the displayed at least one second comment, the count of the currently displayed second comment also changes accordingly. Generally, the sequence identifier of the at least one second comment can be taken as the count of the at least one second comment, and the count of the at least one second comment and the total number of all the first comment(s) are displayed in the first area of the online document in the conference interface. When the displayed at least one second comment is switched, the count of the at least one second comment is updated.

Users can perform various operations on the first comment(s) or the at least one second comments, such as clearing, replying, translating, and editing, etc. For ease of understanding, the operations are described below.

In some embodiments, in response to detecting any of the first comment(s) is cleared, a clearing label is added to the cleared first comment. The detecting any of the first comment(s) is cleared mentioned above comprises: detecting a triggering event occurring on a preset deletion control or completion control of the first comment(s).

The first area of the online document is configured with a deletion control, and the first user has a permission to delete the first comment(s) he/she annotates. In this case, in response to a trigger operation of the first user on the preset deletion control of the first comment, a clearing label is added to the cleared first comment.

The first area of the online document is configured with a completion control; after multiple second users complete their processing on the first comment(s) (for example, solving the first comment(s) or reading the first comment(s)), the second users have a permission to mark the first comment(s) as completed. In this case, in response to a trigger operation of the second user on the preset completion control of the first comment(s), a clearing label is added to the completed first comment(s).

According to the above embodiment, the clearing label is added to the cleared first comment. The clearing label can be used to indicate multiple users to synchronously delete the first comment, or to distinguish from the first comment(s) that is not cleared. It can be understood that the cleared first comment(s) mentioned above can also be the at least one second comment to be displayed or currently being displayed.

When switching to the at least one second comment to be displayed to which a clearing label is added according to the comment switching operation, in some embodiments, the next first comment of the currently determined at least one second comment can be taken as a new second comment according to the sequence identifier of the first comment, and the new second comment is displayed in the first area of the online document. It is a simple and direct display method that the present embodiment directly switches to the next first comment to display it as a new second comment in the case that the determined at least one second comment to be displayed has been cleared.

In other embodiments, in response to any of the at least one second comment is the first comment to which the clearing label is added, clearing prompt information can be generated, the clearing prompt information is displayed in the first area of the online document. And then, in response to the comment switching operation of the second user, a new second comment to be displayed is obtained. Alternatively, in response to display time of the clearing prompt information reaches a preset display time threshold, the next first comment as the new second comment to be displayed is automatically switched. In different scenarios, in order to more visibly distinguish different comment clearing methods based on the deletion control or the completion control, the clearing prompt information mentioned above can comprise different prompt contents. For example, for the first comment that is cleared based on a trigger operation on the deletion control, the clearing prompt information can be: the comment has been deleted; for the first comment that is cleared based on a trigger operation on the completion control, the clearing prompt information can be: the comment has been completed or the comment has been solved.

In the present embodiment, in a case where the at least one second comment has been cleared, a process of displaying the clearing prompt information is added. By the design of this intermediate state interface, a abrupt feeling between comment clearing and comment switching is reduced, thereby improving the user experiences.

In some embodiments, in response to detecting that any first comment is cleared, a current number of all the first comment(s) is updated and the updated number is displayed in the first area of the online document.

In the process of displaying the at least one second comment, the first user and the second user can submit reply contents to the at least one second comment. Based on this, the present embodiment comprises: obtaining the reply content submitted by the first user and/or the second user to the at least one second comment, wherein the reply content comprises text information and/or emoji information; and displaying the at least one second comment and the reply content of the at least one second comment according to a preset alignment manner in the first area of the online document. The alignment manner for example is: the second comment and its reply content are arranged vertically, and the second comment is placed on top.

In some embodiments, the operation of the comment(s) further comprises translating, the comment display method further comprising: in response to a translating operation of the first user and/or the second user on the at least one second comment, generating a translation result of the at least one second comment; and displaying the translation result of the at least one second comment in the first area of the online document of a user who performs the translating operation.

Due to the different language environments of different users, which may comprise Chinese, English, Russian, etc., the language of the at least one second comment and its reply content may not necessarily be suitable for all users corresponding to the online document. In a specific implementation, the first user and/or the second user initiate(s) the translating operation on an object to be translated, which comprises the at least one second comment and/or its reply content. In response to the translating operation, the object to be translated, a source language corresponding to the object to be translated and a selected target language are obtained, and the object to be translated in the source language is converted to a translation result in the target language. The translation result of the at least one second comment is displayed in the first area of the online document of a user who initiates the translating operation.

In some embodiments, the operation of the comment(s) further comprises editing. In some embodiments, in response to an editing operation of the first user and/or the second users on a target comment, wherein the target comment is a comment annotated by the first user or the second user, a comment editing content is obtained, and a first comment is updated according to the comment editing content; after that, the updated first comment is determined as a second comment be displayed as the comment switching operation and the second comment is displayed in the first area of the online document in the conference interface of the second user, the displayed second comment is the first comment after updating the comment editing content.

According to the comment switching operation, the second comment can be determined from all the first comments one by one, until the displayed second comment is the last one of the first comments. In the process of displaying each second comment one by one, the second user can exit the target browsing mode at any time.

In an application scenario of displaying the online document in the conference interface of the second user and displaying the comment mode control in the associated area of the first comment(s), a method of exiting the target browsing mode in the present embodiment may comprise: in response to the second user stopping following the view of the current presenter or the second user exiting the conference, hiding the comment mode control.

The stopping following the view of the current presenter can be understood as that the second user stops synchronously following the view of the presenter in a conference scene and has a free browsing permission. Specifically, when the presenter controls the view of the conference interface to change through various operations such as switching the second comment, scrolling the online document, selecting a highlighting area, etc., the conference interface of the second user will not change synchronously with the view of the presenter. At the same time, the second user can freely browse the online document, the first comment(s), and the reply content according to actual needs.

"The second user exiting the conference" can be understood as stopping displaying the conference interface of the second user and returning to an interface of the online document.

In an application scenario of displaying the at least one second comment in the first area of the online document in the conference interface of the second user, the method of exiting the target browsing mode in the present embodiment may comprise: in response to the second user stopping following the view of the current presenter or the second user exiting a conference, hiding the at least one second comment in the first area of the online document, and displaying the first comment(s) in the first area of the online document.

In the above application scenario where the at least one second comment is displayed, the following embodiments describe the implementation method of the second user exiting the conference.

Figure 3:
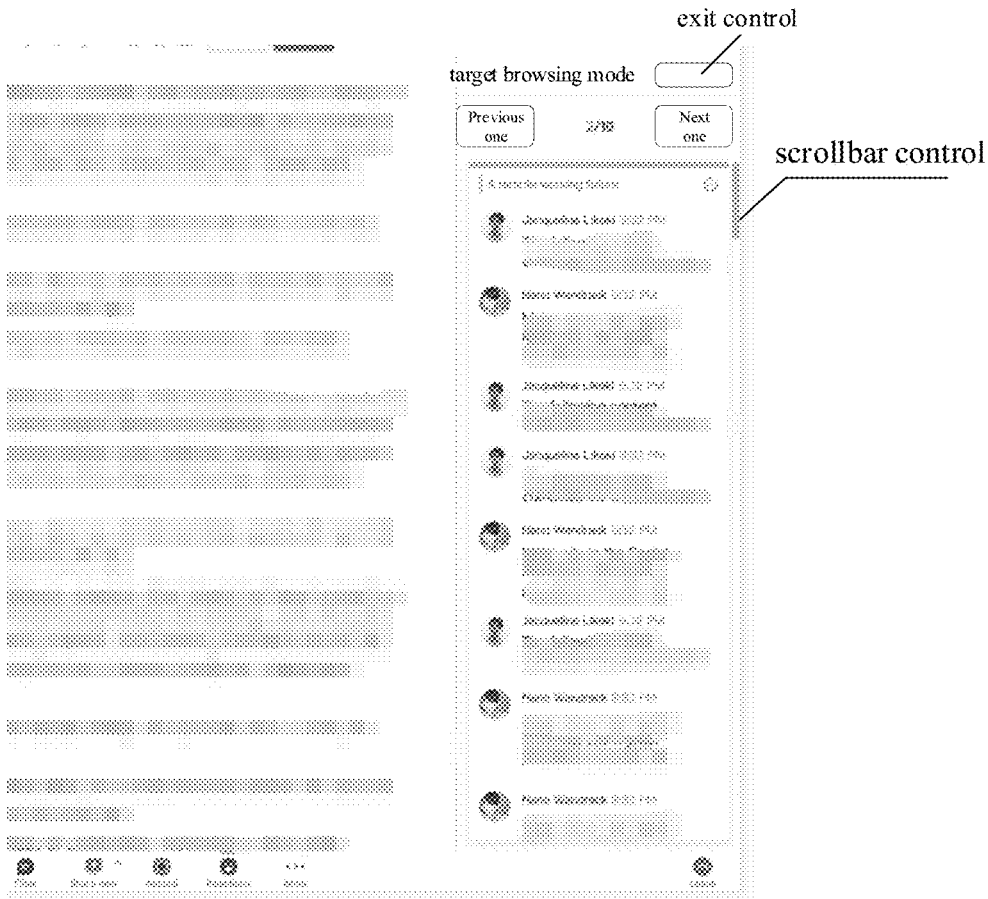
FIG. 3 is a schematic diagram of a control in the first area provided in the embodiments of the present disclosure.

In some embodiments, referring to FIG. 3, an exit control for exiting the conference is set on the first area. When the second user triggers the exit control, in response to the second user exiting the conference, the at least one second comment in the first area of the online document is hidden, and the first comments are displayed in the first area of the online document.

Figure 4:
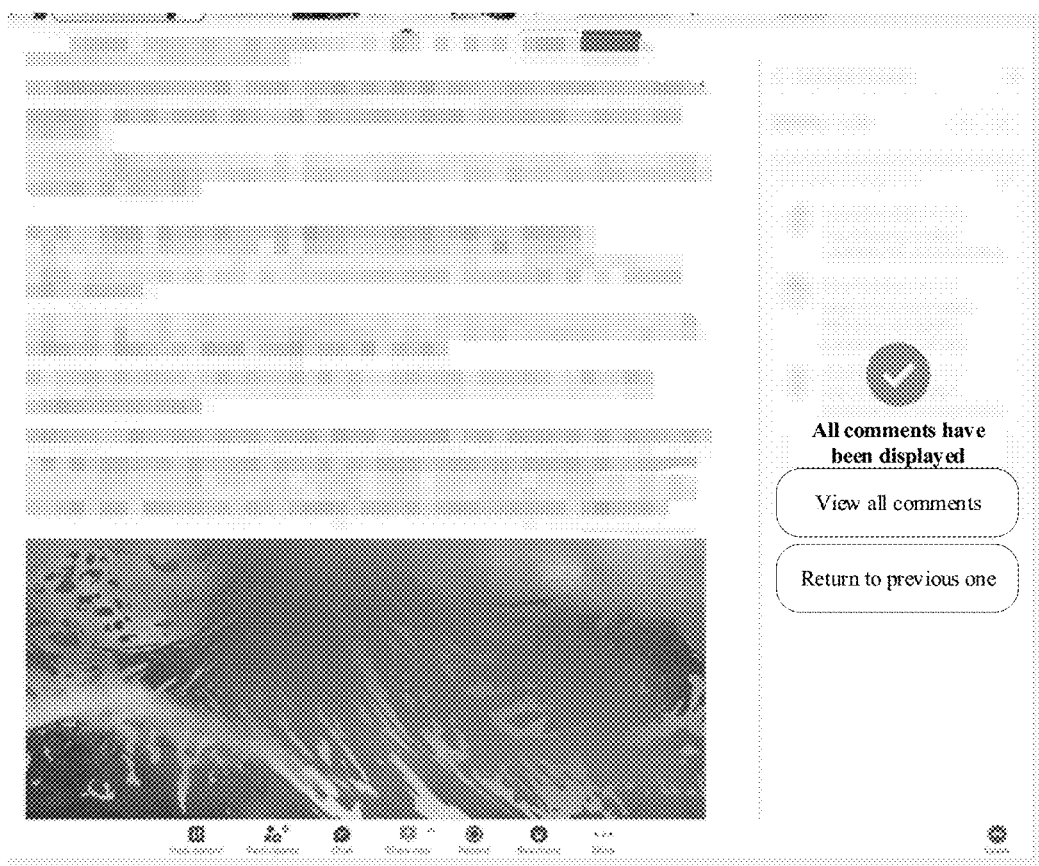
FIG. 4 is a schematic diagram of an exit interface provided in the embodiments of the present disclosure.

In some embodiments, when the at least one second comment is the last first comment, the implementation method for the second user exiting the conference may comprise: entering an exit interface in response to the trigger operation of the second user on a control to switch to a next group. For example, referring to FIG. 4, the exit interface comprises: a message prompting that all comments have been displayed, a control to view all comments, and a control to return to a previous comment. When the second user triggers the control to view all comments, in response to the second user exiting the conference, the at least one second comment in the first area of the online document is hidden, and the first comment(s) is displayed in the first area of the online document.

For displaying the first comment(s) in the first area of the online document, the present embodiment may comprise: obtaining a currently remaining comment(s), which refers to the first comment(s) to which no clearing label is added, that is, the first comment(s) that has not been deleted and has not completed the processing. The remaining comment(s) is displayed in full in the first area of the online document.

Alternatively, the present embodiment may comprise: in the first area of the online document, displaying respectively in full the first comment(s) to which the clearing label is added and the first comment(s) to which the clearing label is not added in different display styles. For example, the first comment(s) to which the clearing label is added is fully displayed in a display style of light gray font, while the first comment(s) to which no clearing label is added is fully displayed in a display style of black font.

At the same time, in the case that the first comment(s) comprises reply content, the first comment(s) and its reply content are displayed in full in the first area simultaneously.

The comment display method of a document provided in the present embodiment further comprises an editing method for an online document, which is described as follows.

In response to an editing operation on descriptive content in the online document, a text position and edited main text content corresponding to the editing operation are obtained; the online document is updated based on the text position and the edited main text content, and the updated online document is displayed in the conference interface.

There are various editing operations for the descriptive content in the online document, such as adding or deleting main text content, modifying main text content, and undoing editing operations, etc. For ease of understanding, the following examples are provided for explanation.

In some embodiments, in response to an inserting operation of the first user, newly added main text content inserted by the first user and an insertion position of the newly added main text content in the online document are obtained, the online document are updated based on the newly added main text content and the insertion position, and the updated online document is displayed.

In some embodiments, in an operation of deleting main text content, objects to be deleted can be divided into a non-highlighting area and a highlighting area. In the case of the highlighting area being deleted, a deletion event of the first comment is detected, and a clearing label is added to the first comment annotated in the deleted highlighting area.

If the first comment corresponding to the deleted highlighting area is the currently displayed second comment, referring to the aforementioned embodiments, the next first comment is directly switched and displayed as a new second comment, or a clearing prompt information is generated and synchronously displayed. The clearing prompt information in this scenario can be for example: original comment has been deleted.

In the above multiple embodiments, as shown in FIG. 2, the online document is displayed in the conference interface, and the first comment(s) or the at least one second comment is displayed in the first area. Considering that in a practical application, the online document and comments often scroll simultaneously, that is, when scrolling any display area where the online document and the comments are located, content in another display area also synchronously follows the scrolling. However, the actual heights of the online document and the comments are different, which can result in the inability to scroll the online document to view contextual content while anchoring the comment currently being explained, or the inability to scroll comments while anchoring the online document. In order to improve the adverse effects of simultaneous scrolling on browsing, the method provided in the present embodiment may further comprise: configuring a first scrolling container for the conference interface displaying the online document, configuring a second scrolling container displaying the first comment(s) or the at least one second comment, wherein the first scrolling container and the second scrolling container are independent of each other.

In this case, in response to a scrolling operation on the conference interface, the online document displayed on the conference interface is scrolled within the first scrolling container; and in response to a scrolling operation on the first area, the first comment(s) or the at least one second comment displayed in the first area is scrolled within the second scrolling container.

Referring to FIG. 3, taking the first area as an example, the second scrolling container provides a scrollbar control. When the user operates the scrollbar control in the first area by methods such as sliding, clicking, etc., in response to a scrolling operation on the scrollbar control in the first area, the first comment(s) or the at least one second comment displayed in the first area is scrolled within the second scrolling container. In a process of browsing comments, if a comment itself contains a lot of content or if there are a lot of reply contents to the comment, the comment and is reply contents displayed in the first area can be scrolled within the second scrolling container.

Figure 5:
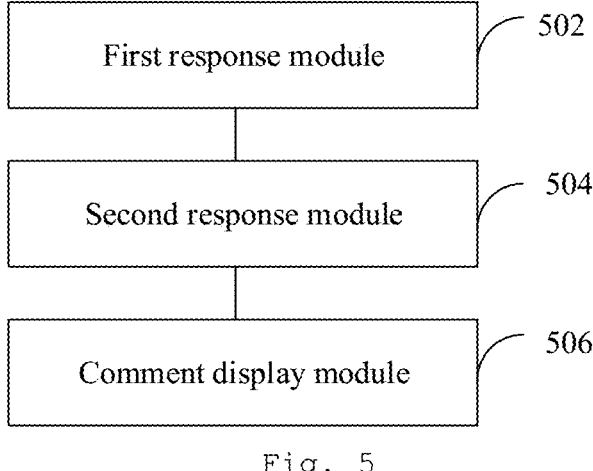
FIG. 5 is a schematic diagram of the structure of a comment display device of a document provided in the embodiments of the present disclosure.

By configuring the first scrolling container for the conference interface and configuring the second scrolling container for the first area, independent scrolling of the online document and the at least one second comment is achieved. In the process of scrolling the online document, current contextual positions of the at least one second comment and its reply content are not affected. Similarly, in the process of scrolling the at least one second comment, the current contextual position of the online document is not affected. According to the comment display method of a document provided in the above embodiments, an embodiment of the present disclosure provides a comment display apparatus of a document, for implementing the comment display method of a document mentioned above; the device is set in an electronic equipment such as a server, a mobile terminal, or a server cluster. Referring to FIG. 5, the device comprises:

a first response module 502 configured to, in response to a comment operation of a first user on an online document, display a first comment(s) in a first area of the online document;

a second response module 504 configured to, in response to a trigger operation of a second user on a comment mode control in the online document, determine at least one second comment to be displayed from the first comment(s), wherein the at least one second comment is at least one of the first comment(s);

a comment display module 506 configured to display the at least one second comment in the first area of the online document.

The comment display device of a document provided in the embodiment of the present disclosure can execute the comment display method of a document provided in any embodiment of the present invention, and has the corresponding functional modules for executing the method and the beneficial effects.

Figure 6:
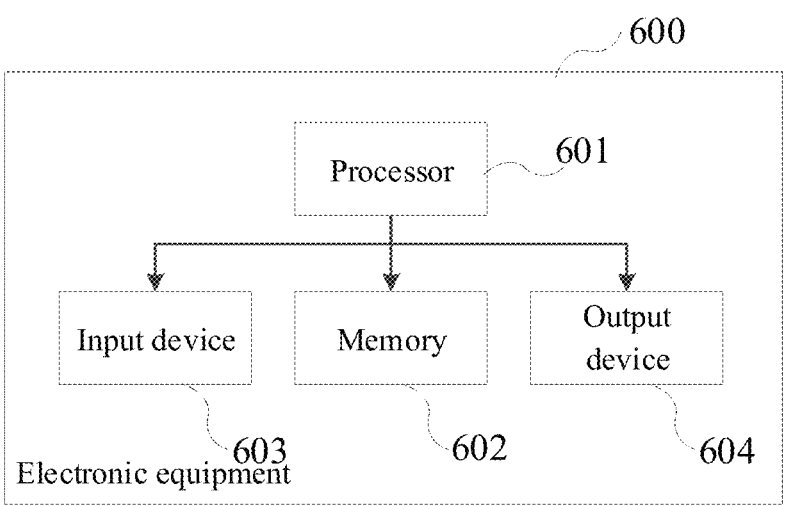
FIG. 6 is a schematic diagram of the structure of an electronic equipment provided in the embodiments of the present disclosure.

FIG. 6 is a schematic diagram of the structure of an electronic equipment provided in the embodiments of the present disclosure. As shown in FIG. 6, the electronic equipment 600 comprises one or more processors 601 and memories 602.

The processor 601 can be a Central Processing Unit (CPU) or other forms of processing units with data processing capability and/or instruction execution capability, and can control other components in the electronic equipment 600 to perform desired functions.

The memory 602 can comprise one or more computer program products, which can comprise various forms of computer-readable storage media, such as a volatile memory and/or a non-volatile memory. The volatile memory may comprise, for example, a Random Access Memory (RAM) and/or a cache memory, etc. The non-volatile memory may comprise, for example, a Read-Only Memory (ROM), a hard disk, a flash memory, etc. One or more computer program instructions can be stored in the computer-readable storage medium, and the processor 601 can run the program instructions to implement the comment display method of a document and/or other desired functions provided in the embodiments of the present disclosure as described above. Various contents such as an input signal, a signal component, a noise component, and so on can also be stored in the computer-readable storage medium.

In one example, the electronic equipment 600 can further comprise: an input device 603 and an output device 604, these components are interconnected through a bus system and/or other forms of connecting mechanisms (not shown).

In addition, the input device 603 can further comprise, for example, a keyboard, a mouse, and so on.

The output device 604 can output various information to the outside, comprising the determined distance information, direction information, etc. The output device 604 may comprise, for example, a display, a speaker, a printer, and a communication network and a remote output device connected to it, etc.

Of course, for simplicity, only some of the components related to the present disclosure in the electronic equipment 600 are shown in FIG. 6, and components such as a bus, an input/output interface, and so on are omitted. In addition, depending on the specific application situation, the electronic equipment 600 can also comprise any other suitable components.

In addition to the above-mentioned method and apparatus, an embodiment of the present disclosure can also be a computer program product, comprising computer program instructions that cause the processor to execute the comment display method of a document described in the embodiments of the present disclosure when the computer program instructions are run by the processor.

The computer program product can write program codes for executing the operations provided in the embodiments of the disclosure in any combination of one or more programming languages. The programming languages comprise object-oriented programming languages such as Java, C++, etc., as well as conventional procedural programming languages such as "C" language or similar programming languages. The program codes can be completely executed on a user computing device, partially executed on a user device, executed as an independent software package, executed partially on a user computing device and partially on a remote computing device, or completely executed on a remote computing device or a server.

In addition, an embodiment of the present disclosure can also be a computer-readable storage medium, on which computer program instructions are stored, and the computer program instructions cause the processor to execute the comment display method of a document provided in the embodiments of the present disclosure when run by the processor.

The computer-readable storage medium may adopt any combination of one or more readable media. The readable medium can be a readable signal medium or a readable storage medium. The readable storage medium for example may comprise, but not limited to, an electric, magnetic, optical, electromagnetic, infrared, or semiconductor system, device or component, or any combination thereof. More specific examples of the readable storage medium (a non-exhaustive list) comprise: an electrical connection with one or more wires, a portable disk, a hard drive, a Random Access Memory (RAM), a Read-Only Memory (ROM), an Erasable Programmable Read-Only Memory (EPROM or flash), an optical fiber, a Portable Compact Disk Read-Only Memory (CD-ROM), an optical storage device, a magnetic storage device, or any suitable combination thereof.

An embodiment of the present disclosure further provides a computer program product, comprising a computer program/instruction that implements the method provided in the embodiment of the present disclosure when executed by a processor.

The present disclosure also provides a computer program, comprising: instructions that, when executed by a processor, cause the processor to execute the comment display method of a document provided in any of the aforementioned embodiments.

It should be noted that in this text, relational terms such as "first" and "second" are only used to distinguish one entity or operation from another entity or operation, and do not necessarily require or imply any actual relationship or order between these entities or operations. Moreover, terms "comprise", "include", or any other variation thereof are intended to encompass non-exclusive inclusion, such that a process, method, item, or device that comprises a series of elements not only comprises those elements, but also comprises other elements that are not explicitly listed, or also comprises elements inherent to such process, method, item, or device. If without further limitations, the element defined by the statement "comprising one . . . " do not exclude the existence of other identical elements in the process, method, item, or device that comprises the said element.

The above is only the specific implementation of the present disclosure, which enables those skilled in the art to understand or implement this disclosure. Various modifications to these embodiments will be obvious to those skilled in the art, and the general principles defined herein can be implemented in other embodiments without departing from the spirit or scope of the present disclosure. Therefore, the present disclosure will not be limited to the embodiments described herein, but will conform to the widest scope consistent with the principles and novel features disclosed herein.

What is claimed is:

1. A comment display method of a document, comprising:

in response to a comment operation of a first user on an online document, obtaining all highlighting area(s) in the online document, identifying first comment(s) annotated in the highlighting area(s) by a sequence number to obtain a sequence identifier of each of the first comment(s) according to an arrangement order of a position(s) of each of the highlighting area(s) in the online document and displaying the first comment(s) in a first area of the online document, wherein the comment operation comprises an operation of highlighting words in the online document and annotating a highlighting area with comment content;

in response to a trigger operation of a second user on a comment mode control in the online document, obtaining the sequence identifier of the each of the first comment(s), and determining at least one second comment to be displayed from the first comment(s) based on the sequence identifier of the each of the first comment(s), comprising, in response to a comment switching operation of the second user, obtaining a first sequence identifier of a currently displayed comment and a switching quantity of comments, wherein the comment switching operation comprises a trigger operation on a switching control or a comment closing control, determining a second sequence identifier by adding the first sequence identifier and the switching quantity of comments and determining the first comment corresponding to the second sequence identifier as the at least one second comment to be displayed; and displaying the at least one second comment in the first area of the online document, wherein the comment mode control is an entry control used to enter a target browsing mode of comment, and in the target browsing mode, a portion of all the first comments as the at least one the second comment is synchronously displayed to at least one second user corresponding to the online document.

2. The comment display method according to claim 1, further comprising, before responding to the trigger operation of the second user on the comment mode control in the online document:

in response to a sharing operation on the online document in a conference interface, displaying the online document in a conference interface of the second user, and displaying the comment mode control in an associated area of the first comment(s), wherein the second user is a user following a view of a current presenter.

3. The comment display method according to claim 2, wherein the displaying the at least one second comment in the first area of the online document comprises:

displaying the at least one second comment in the first area of the online document in the conference interface of the second user.

4. The comment display method according to claim 2, further comprising:

in response to the second user stopping following the view of the current presenter or the second user exiting a conference, hiding the comment mode control.

5. The comment display method according to claim 2, further comprising:

in response to the second user stopping following the view of the current presenter or the second user exiting a conference, hiding the at least one second comment in the first area of the online document, and displaying the first comment(s) in the first area of the online document.

6. The comment display method according to claim 2, further comprising:

configuring a first scrolling container for the conference interface displaying the online document, configuring a second scrolling container for the first area displaying the first comment(s) or the at least one second comment, wherein the first scrolling container and the second scrolling container are independent of each other;

in response to a scrolling operation on the conference interface, scrolling the online document displayed on the conference interface within the first scrolling container; and in response to a scrolling operation on the first area, scrolling the first comment(s) or the at least one second comment displayed in the first area within the second scrolling container.

7. The comment display method according to claim 1, further comprising:

in response to detecting that any of the first comment(s) is cleared, adding a clearing label to the cleared first comment.

8. The comment display method according to claim 7, wherein the displaying the first comments in the first area of the online document comprises:

in the first area of the online document, displaying respectively in full the first comment(s) to which the clearing label is added and the first comment(s) to which the clearing label is not added in different display styles.

9. The comment display method according to claim 7, wherein the displaying the at least one second comment in the first area of the online document comprises:

in response to any of the at least one second comment is the first comment to which the clearing label is added, generating clearing prompt information, and displaying the clearing prompt information in the first area of the online document.

10. The comment display method according to claim 1, wherein the determining the at least one second comment to be displayed from the first comment(s) comprises:

in response to a selecting operation of the second user on a first highlighting area, obtaining a first anchor point pre-marked in the first highlighting area, wherein the first anchor point is configured to direct to the sequence identifier; and determining the first comment corresponding to the sequence identifier to which the first anchor point directs as the at least one second comment to be displayed.

11. The comment display method according to claim 1, further comprising: after the determining the at least one second comment to be displayed from the first comment(s), obtaining a second highlighting area annotated with the at least one second comment; and displaying document content of the second highlighting area contained in the online document in the conference interface of the second user, wherein the second highlighting area is displayed according to a preset highlighting style.

12. The comment display method according to claim 1, further comprising:

obtaining reply content submitted by the first user and/or the second user to the at least one second comment, wherein the reply content comprises text information and/or emoji information; and displaying the at least one second comment and the reply content of the at least one second comment according to a preset alignment manner in the first area of the online document.

13. The comment display method according to claim 1, further comprising:

in response to a translating operation of the first user and/or the second user on the at least one second comment, generating a translation result of the at least one second comment; and displaying the translation result of the at least one second comment in the first area of the online document of a user who performs the translating operation.

14. An electronic equipment, comprising:

a processor;

a memory for storing executable instructions that can be executed by the processor, wherein the processor is configured to read the executable instructions from the memory and the executable instructions when executed by the processor cause the processor to:

in response to a comment operation of a first user on an online document, obtain all the highlighting area(s) in the online document, identify the first comment(s) annotated in the highlighting area(s) by a sequence number to obtain a sequence identifier of each of the first comment(s) according to an arrangement order of a position(s) of each of the highlighting area(s) in the online document and display the first comment(s) in a first area of the online document, wherein the comment operation comprises an operation of highlighting words in the online document and annotating a highlighting area with comment content;

in response to a trigger operation of a second user on a comment mode control in the online document, obtain the sequence identifier of the each of the first comment(s), and determine at least one second comment to be displayed from the first comment(s) based on the sequence identifier of the each of the first comment(s), comprising, in response to a comment switching operation of the second user, obtaining a first sequence identifier of a currently displayed comment and a switching quantity of comments, wherein the comment switching operation comprises a trigger operation on a switching control or a comment closing control, determining a second sequence identifier by adding the first sequence identifier and the switching quantity of comments and determining the first comment corresponding to the second sequence identifier as the at least one second comment to be displayed; and display the at least one second comment in the first area of the online document, wherein the comment mode control is an entry control used to enter a target browsing mode of comment, and in the target browsing mode, a portion of all the first comments as the at least one the second comment is synchronously displayed to at least one second user corresponding to the online document.

15. The electronic equipment according to claim 14, wherein the executable instructions when executed by the processor further cause the processor to: before responding to the trigger operation of the second user on the comment mode control in the online document, in response to a sharing operation on the online document in a conference interface, display the online document in a conference interface of the second user, and display the comment mode control in an associated area of the first comment(s), wherein the second user is a user following a view of a current presenter.

16. The electronic equipment according to claim 15, wherein the displaying the at least one second comment in the first area of the online document comprises:

displaying the at least one second comment in the first area of the online document in the conference interface of the second user.

17. A non-transitory computer-readable storage medium, wherein the storage medium stores a computer program which when executed by the computer equipment causes the computer equipment to:

in response to a comment operation of a first user on an online document, obtain all highlighting area(s) in the online document, identify first comment(s) annotated in the highlighting area(s) by a sequence number to obtain a sequence identifier of each of the first comment(s) according to an arrangement order of a position(s) of each of the highlighting area(s) in the online document and display the first comment(s) in a first area of the online document, wherein the comment operation comprises an operation of highlighting words in the online document and annotating a highlighting area with comment content;

in response to a trigger operation of a second user on a comment mode control in the online document, obtain the sequence identifier of the each of the first comment(s), and determine at least one second comment to be displayed from the first comment(s) based on the sequence identifier of the each of the first comment(s), comprising, in response to a comment switching operation of the second user, obtaining a first sequence identifier of a currently displayed comment and a switching quantity of comments, wherein the comment switching operation comprises a trigger operation on a switching control or a comment closing control, determining a second sequence identifier by adding the first sequence identifier and the switching quantity of comments and determining the first comment corresponding to the second sequence identifier as the at least one second comment to be displayed; and display the at least one second comment in the first area of the online document, wherein the comment mode control is an entry control used to enter a target browsing mode of comment, and in the target browsing mode, a portion of all the first comments as the at least one the second comment is synchronously displayed to at least one second user corresponding to the online document.

\* \* \* \* \*